Nov. 13, 1956 H. L. THOLSTRUP 2,770,304

RELAY STORAGE UNIT

Filed Dec. 21, 1951 15 Sheets-Sheet 1

Inventor
HENRY L. THOLSTRUP

By Robert S. Dunham

Attorney

Nov. 13, 1956 H. L. THOLSTRUP 2,770,304

RELAY STORAGE UNIT

Filed Dec. 21, 1951 15 Sheets-Sheet 2

Inventor
HENRY L. THOLSTRUP

By Robert S. Dunham

Attorney

Nov. 13, 1956 H. L. THOLSTRUP 2,770,304

RELAY STORAGE UNIT

Filed Dec. 21, 1951 15 Sheets-Sheet 3

Inventor
HENRY L. THOLSTRUP

Robert S. Dunham

Attorney

Nov. 13, 1956 H. L. THOLSTRUP 2,770,304

RELAY STORAGE UNIT

Filed Dec. 21, 1951 15 Sheets-Sheet 4

INVENTOR
HENRY L. THOLSTRUP
BY Robert S. Dunham
ATTORNEY

RELAY STORAGE UNIT

Filed Dec. 21, 1951 15 Sheets-Sheet 5

Inventor
HENRY L. THOLSTRUP

By Robert S. Dunham

Attorney

Nov. 13, 1956 H. L. THOLSTRUP 2,770,304

RELAY STORAGE UNIT

Filed Dec. 21, 1951 15 Sheets-Sheet 6

Inventor
HENRY L. THOLSTRUP

By

Robert S. Dunham

Attorney

INVENTOR
HENRY L. THOLSTRUP
BY Robert S. Dunham
ATTORNEY

Nov. 13, 1956 H. L. THOLSTRUP 2,770,304

RELAY STORAGE UNIT

Filed Dec. 21, 1951 15 Sheets-Sheet 8

INVENTOR
HENRY L. THOLSTRUP
BY Robert S. Dunham
ATTORNEY

INVENTOR
HENRY L. THOLSTRUP
BY Robert S. Dunham
ATTORNEY

INVENTOR
HENRY L. THOLSTRUP
BY Robert S. Dunlam
ATTORNEY

INVENTOR
HENRY L. THOLSTRUP
BY Robert S. Dunham
ATTORNEY

Nov. 13, 1956 H. L. THOLSTRUP 2,770,304

RELAY STORAGE UNIT

Filed Dec. 21, 1951

15 Sheets-Sheet 12

INVENTOR
HENRY L. THOLSTRUP
BY Robert S. Dunham
ATTORNEY

INVENTOR
HENRY L. THOLSTRUP
BY Robert S. Dunham
ATTORNEY

INVENTOR
HENRY L. THOLSTRUP
BY Robert S. Dunham
ATTORNEY

INVENTOR
HENRY L. THOLSTRUP
BY Robert S. Dunham
ATTORNEY

United States Patent Office 2,770,304

Patented Nov. 13, 1956

2,770,304

RELAY STORAGE UNIT

Henry L. Tholstrup, Rochester, N. Y., assignor to International Business Machines Corporation, New York, N. Y., a corporation of New York Application December 21, 1951, Serial No. 262,791

4 Claims. (Cl. 164—113)

This invention deals with a relay storage unit. The invention in particular relates to a relay storage unit for controlling the reproduction of words or phrases, as by punching or typing, upon manipulation of a single control key.

An object of this invention is to provide a relay unit which can energize a plurality of circuits in a predetermined specific sequence automatically, merely by energizing a single relay to start the unit operating.

Another object of this invention is to use the relay unit of this invention in combination with a tape reading device, an electric typewriter, and a tape punching device. The relay unit as used in this combination is adapted to control the making of inserts of any desired material at any desired place in the material contained in a punched control tape being read, so that a punched tape being reproduced under influence of the control tape will contain the matter on the control tape being read, plus the matter inserted by the relay unit. The inserts may be made by a code punched into the control tape being read or by operation of a manual key, since the tape reading operation is suspended while the insert is being made. Using this combination (tape reader, typewriter and tape punch) the text of which is being punched into the new tape may be simultaneously transcribed by the typewriter.

Another object of this invention is to use the relay unit to make inserts in a copy which is being typed. It enables an operator of an electric typewriter to reproduce any specific message, word, syllable, etc. by merely closing a single switch. This one switch may, of course, be an extra key on the typewriter, or some other convenient arrangement. By this means a recurring phrase, word, etc. can be typed as fast as the machine can operate, while the operator need make only one motion to start reproduction of the chosen word or phrase.

Another object of this invention is to provide a group of relays having multiple contacts, and being so connected in conjunction with a device for producing pulses of a definite duration and spacing that the relays will control automatically the closing or energizing of a plurality of circuits in a predetermined sequence.

Further objects and advantages of the invention will become apparent as the description thereof proceeds in connection with the drawings in which like reference numerals indicate like parts, and in which.

Figure 9A:
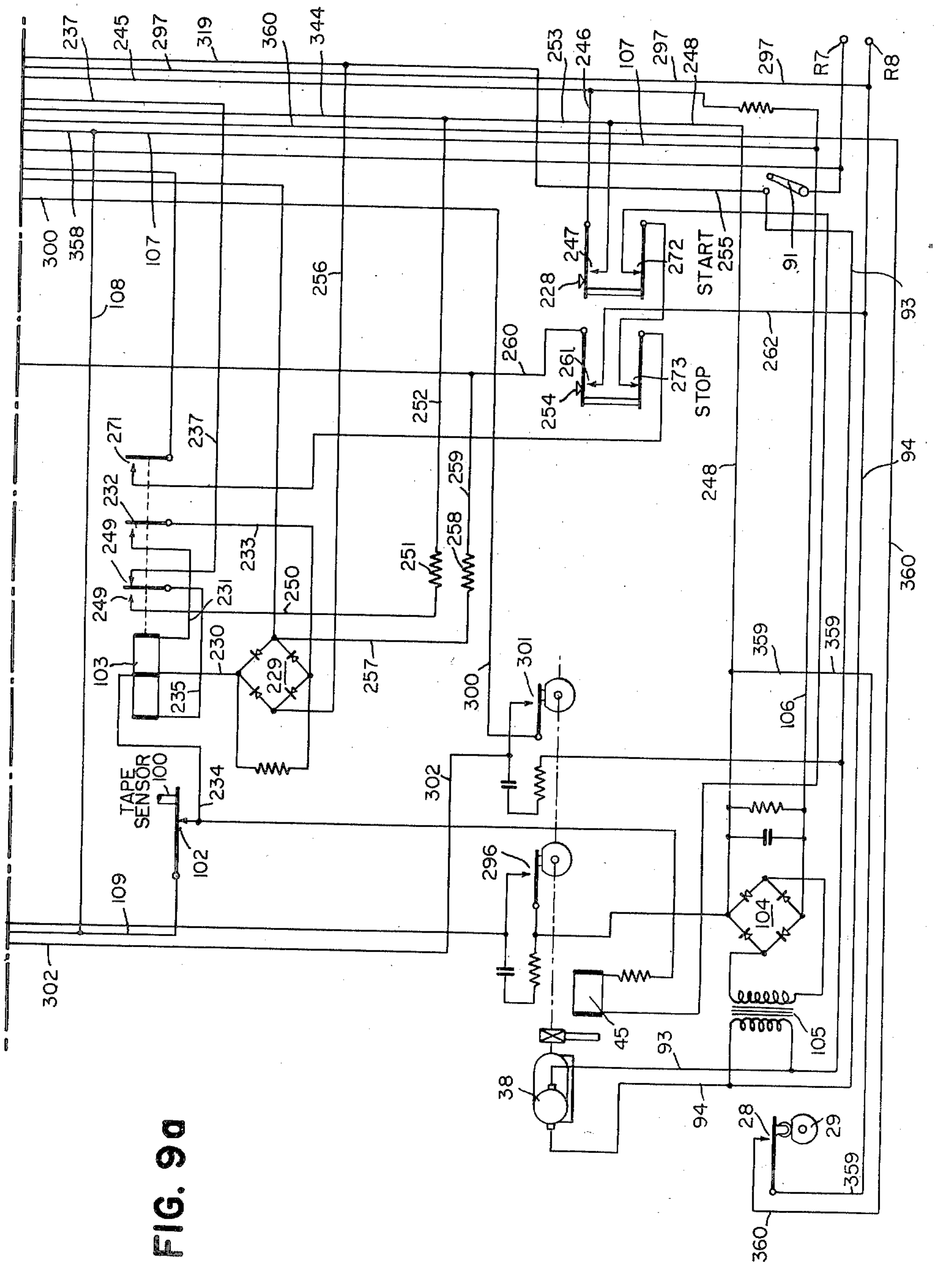
Figure 9B:
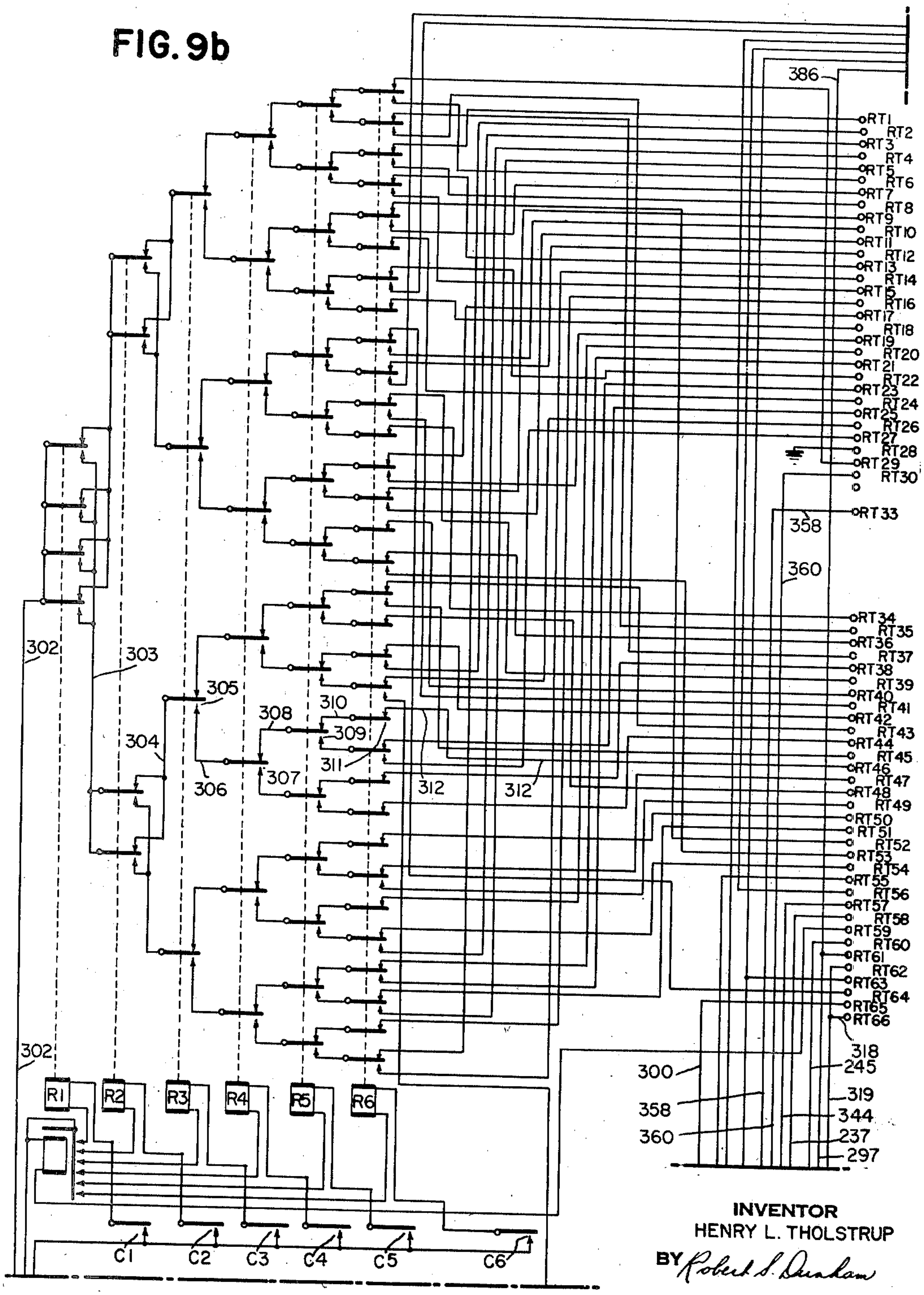
Figure 9C:
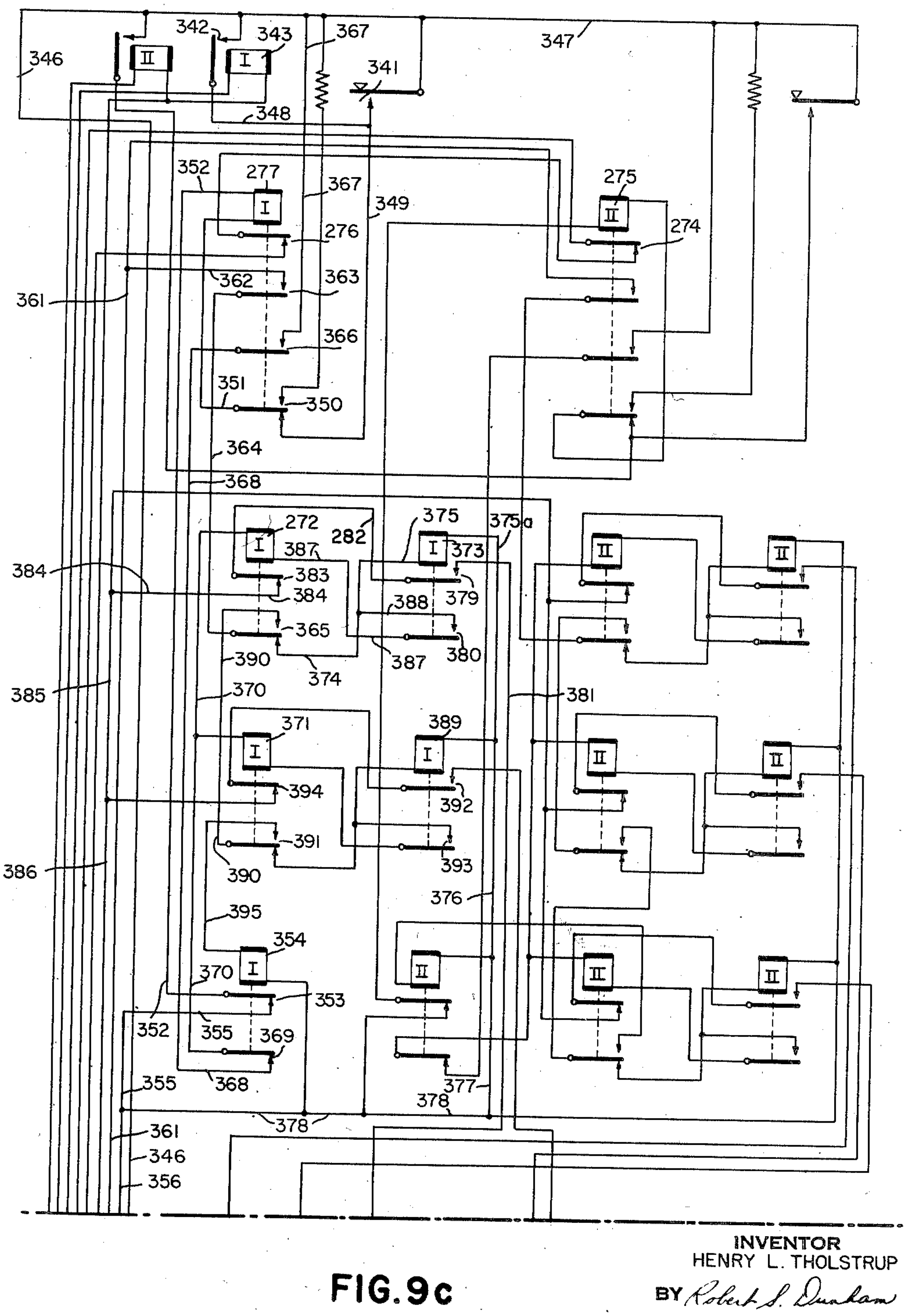
Figure 9D:
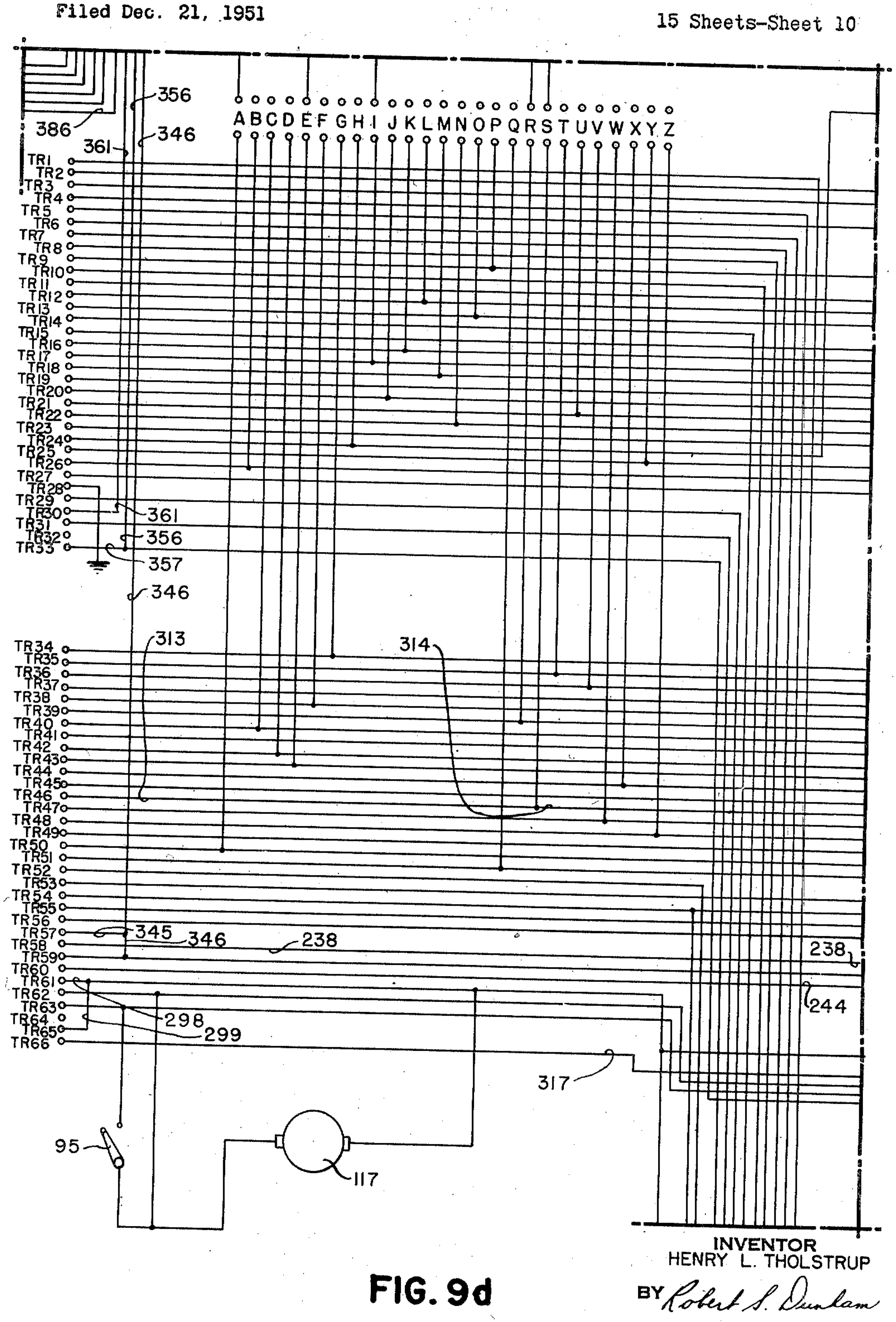
Figure 9E:
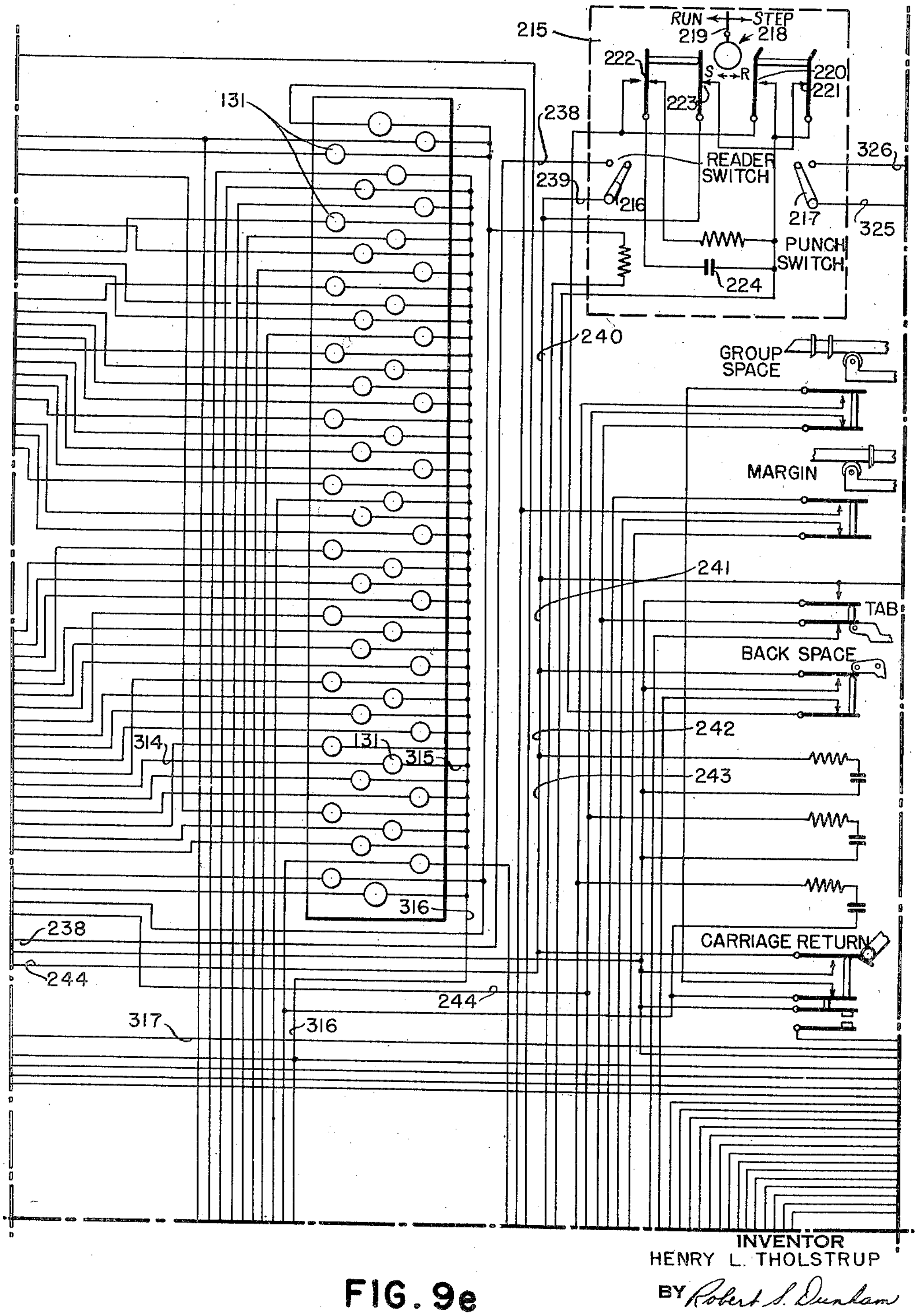
Figure 9F:
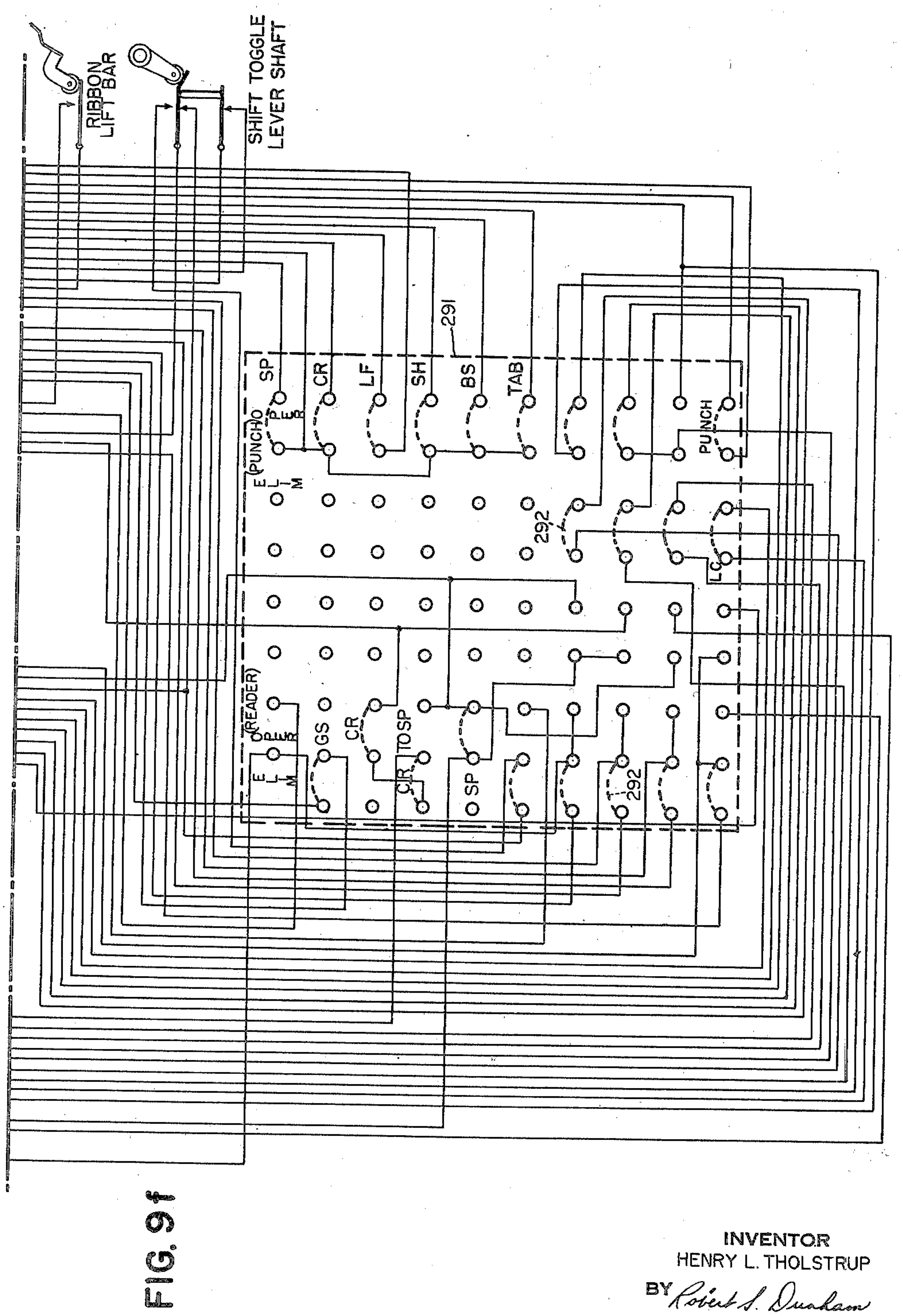
Figure 9G:
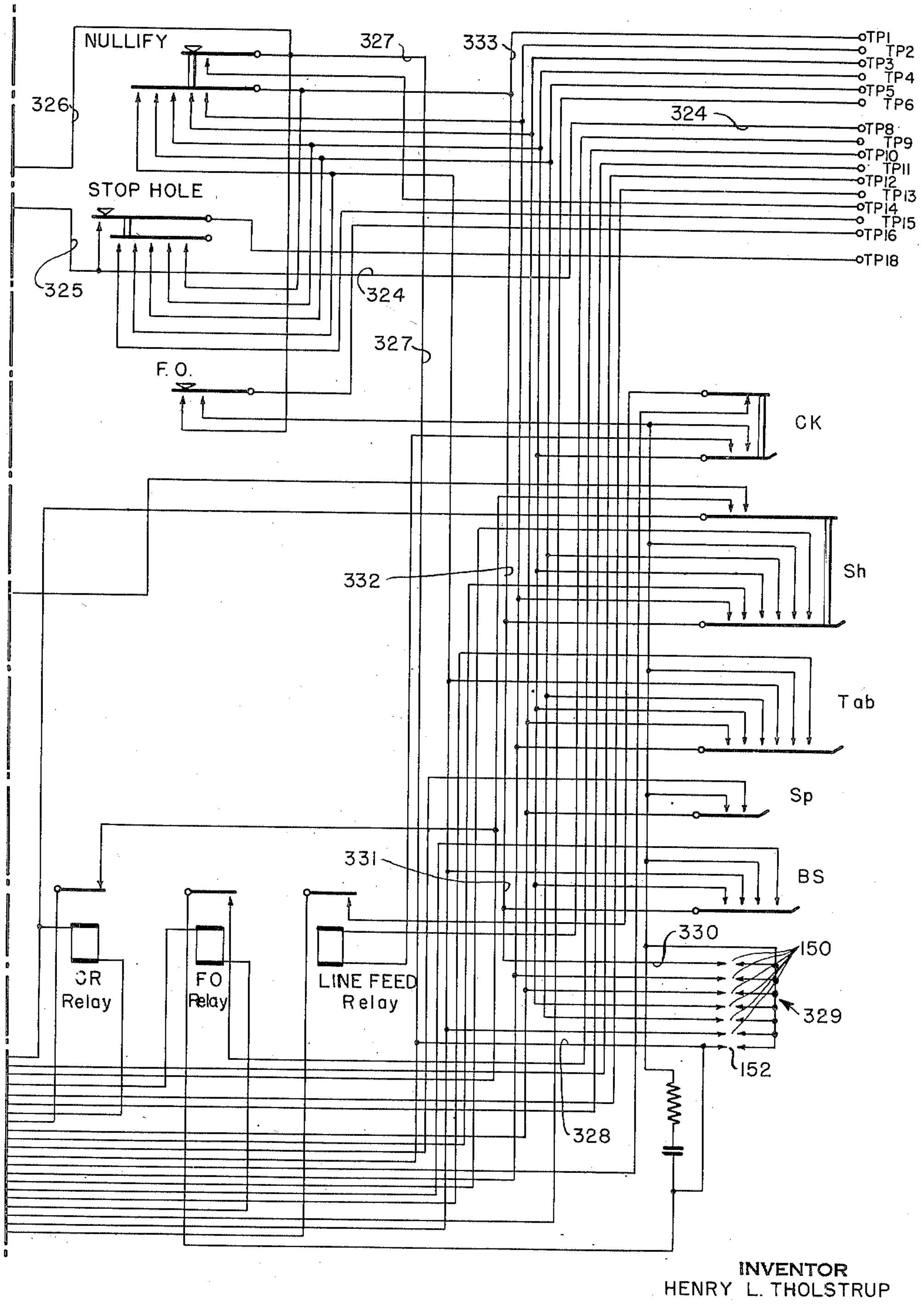
Figure 9H:
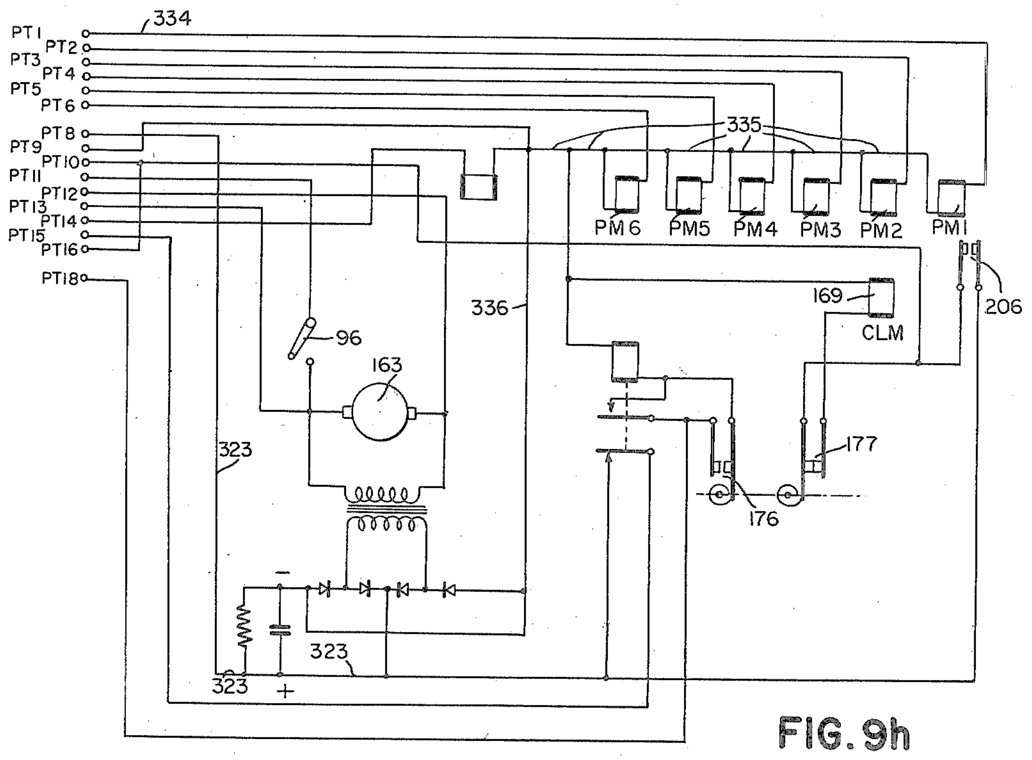
Figure 10:
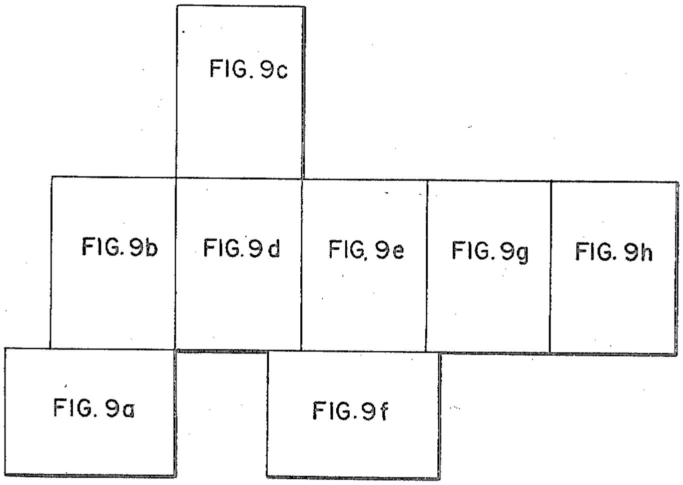
Figure 11:
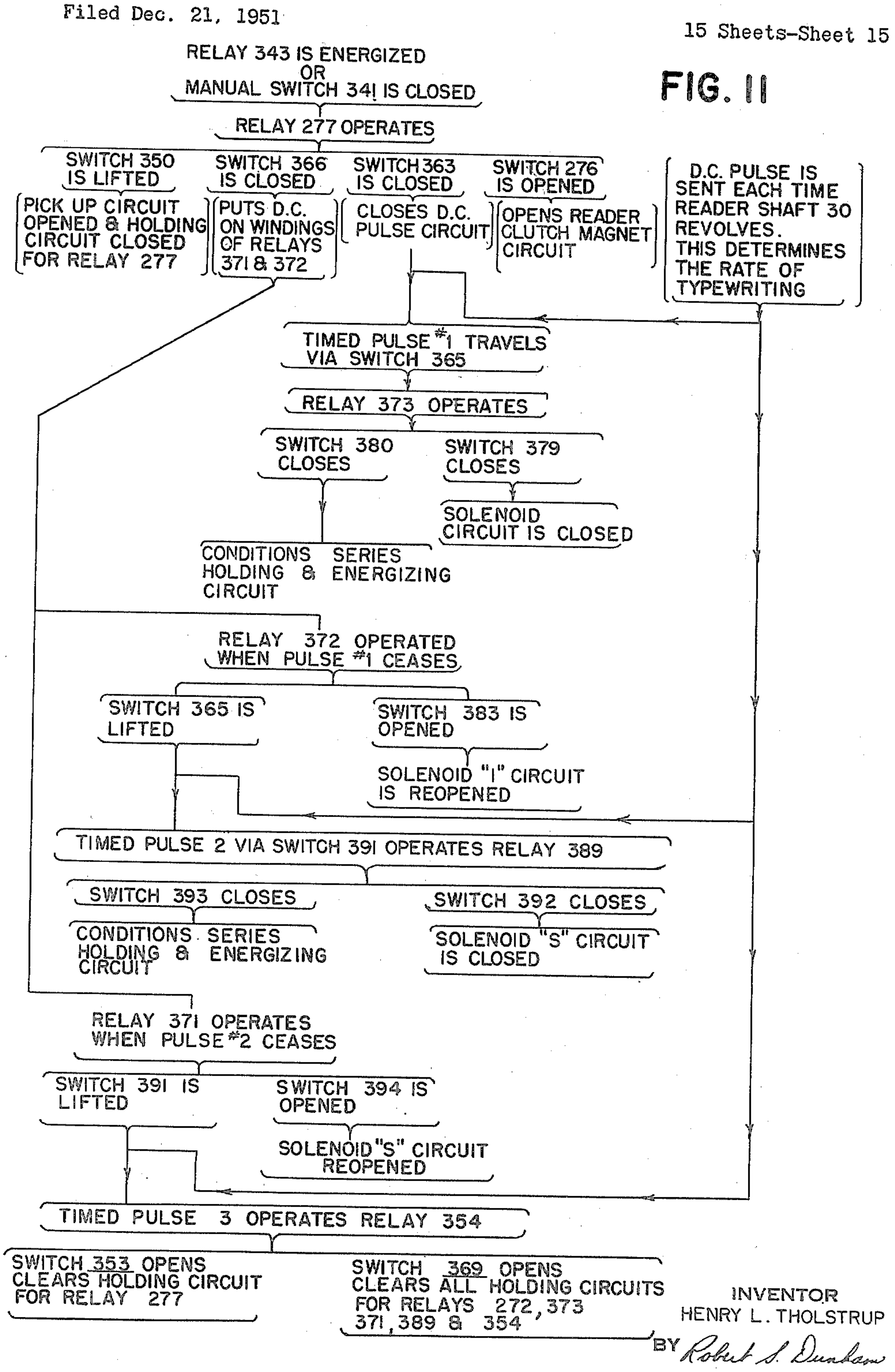

Figs. 9*a*–9*h* taken together constitute the complete wiring diagram of the four units, as connected for operation in accordance with this invention;

Fig. 10 is a diagram of the inter-relation of sheets of drawing containing Figs. 9*a*–9*h* (circuit diagram); and Fig. 11 is a diagram showing the operating sequence of the relay unit.

In order to understand this invention, it will be necessary to understand the specific use to which it is being put. This specific use involves a tape reading unit, an electric typewriter and a tape punch unit in combination, i. e. connected together electrically for combined operation.

Figure 1:
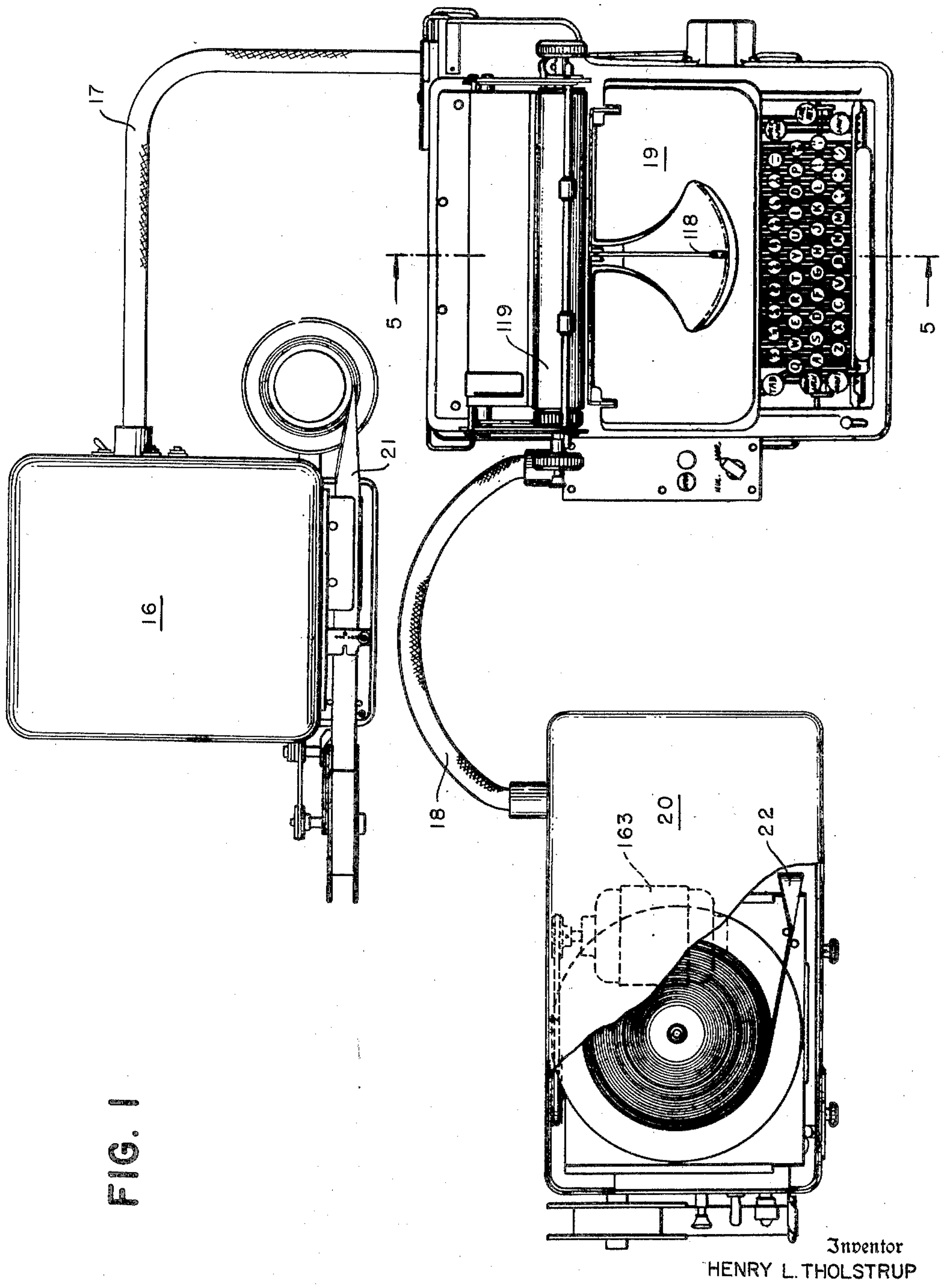
Fig. 1 shows the combination of a tape reader unit, an electric typewriter and a tape punching unit, connected together electrically, and which combination may include a relay storage unit of this invention, located wherever convenient, in or on, these three units.

First, the operation of the three connected units shown in Fig. 1 will be generally described. A tape reading unit 16 is connected electrically by a cable 17 to an electric typewriter 19, which is in turn connected by a cable 18 to a tape punching unit 20. When these three units are connected in this manner, several conditions of operation may be effected, namely: all three units 16, 19 and 20 may be turned on and interconnected; connection may be made such that only the typewriter 19 and the punch 20 are operatively interconnected; connection may be made such that only the tape reader 16 and the typewriter 19 are operatively interconnected; or, of course, the typewriter 19 alone may be used for typing manually in the ordinary way. If all three units (16, 19 and 20) are turned on and operatively connected, whatever message is on a tape 21, being read by the reader 16, will be typed out by the typewriter 19 and at the same time will be reproduced on another tape 22, which will be punched out to correspond to tape 21, unless additional characters are inserted by the relay storage unit with which this invention is concerned.

The relay storage unit (circuit diagram Fig. 9*c*) of this invention consists almost entirely of a group of relays and their electrical interconnecting circuits, so that their physical location is not important and may be anywhere that is convenient. Therefore, this unit is not shown, except for one fragment, anywhere except in the electrical circuit diagram. This one fragment is a pair of contacts 28 operated by a cam 29 located on a drive shaft 30 (Fig. 2), of the reading unit 16. For this reason the relay storage unit may be located on the reading unit 16 in any convenient place and no attempt will be made to show the location of these relays except in their electrical circuit relation, shown by Fig. 9.

Operation of the reading unit 16 will first be described with reference to Figs. 2, 3, 4, 9*a* and 9*b*. Such a unit has been disclosed in greater detail by a number of my issued patents to which reference may be made for any specific details such as functional operations which need not be described here. One such patent is my U. S. Patent No. 2,439,497, issued April 13, 1948. The characters of the text are coded into the tape 21 (Figs. 1 and 4) by punched holes as is shown by the sample tape of Fig. 4. A row of smaller feed holes 31 are engaged by a drive wheel 32 (Figs. 2 and 3) which has short spokes 33 to fit into the feed holes 31, one at a time. The drive wheel 32 is moved by steps in order to move the tape 21 from one reading position to the next.

Figure 2:
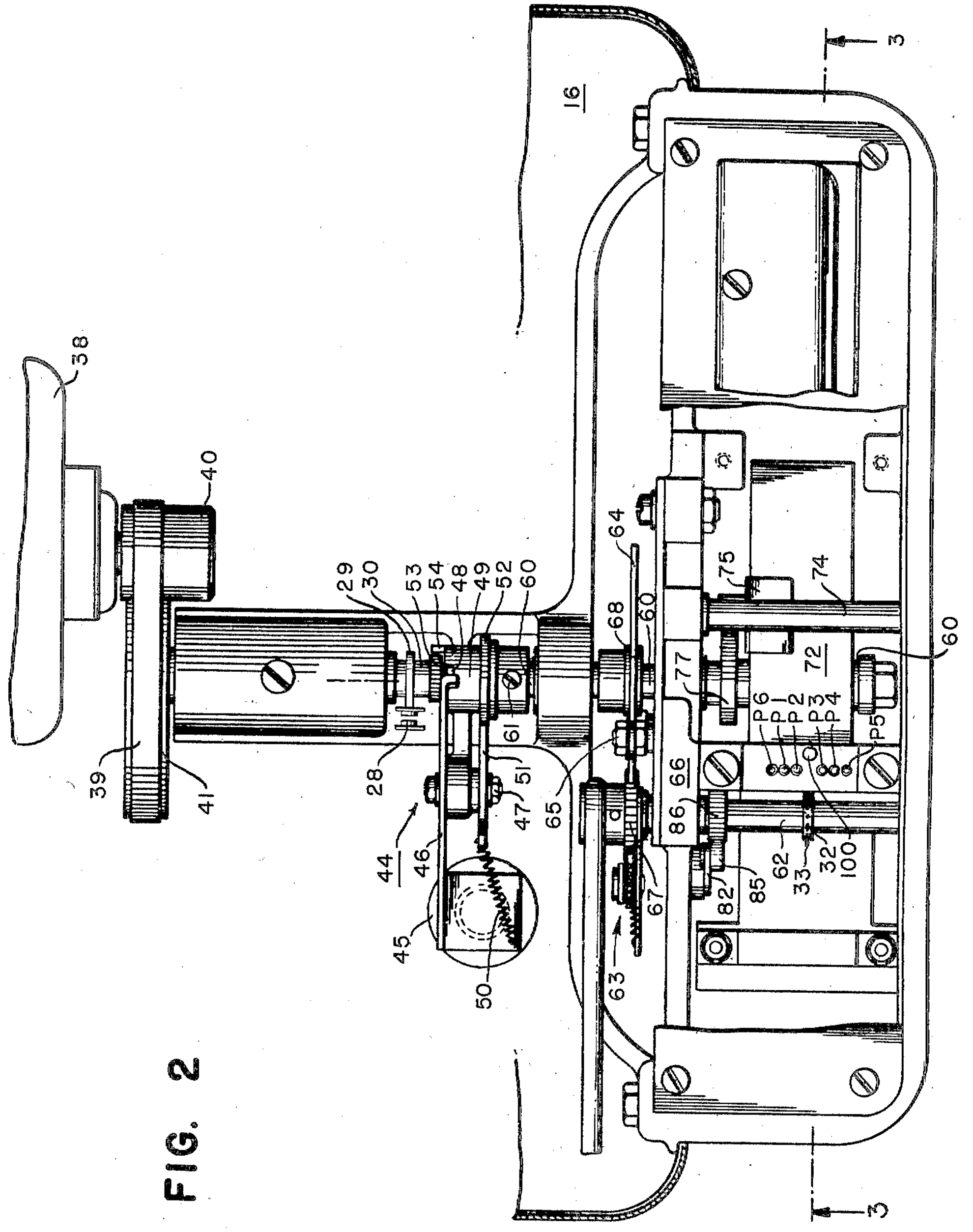
Fig. 2 is a top view of the main working parts of a tape reader unit.

Power to operate the mechanism of the reader unit 16 is derived from an electric motor 38 (Fig. 2), which is connected by a belt 39 and pulleys 40 and 41 to drive shaft 30. The drive shaft 30 is connected to the tape feed and reading mechanism by means of a clutch 44. This clutch may be any convenient type, but is preferably such as that disclosed in U. S. Patent No. 2,206,464, granted July 2, 1940 to Kurt R. Schneider. Reference may be had to this patent for structural details of the clutch 44 presently described. The clutch 44 is electrically controlled by a clutch magnet 45 which causes an arm 46 to be rocked about a pivot screw 47 which determines whether the right end of arm 46 (as seen in Fig. 2) will be raised above a lug 48 in order to clear the lug 48 when a clutch barrel 49 is being rotated. The arm 46 is spring-biased away from the clutch magnet 45 so that when the clutch magnet is not energized, a spring 50 will lift the left end of the arm 46 as seen in Fig. 2. This is due to the location of the spring 50 which is connected to the end of another arm 51, located above the clutch magnet end of the arm 46 as seen in Fig. 2. The arm 51 also pivots about pivot screw 47 and so because of the spring 50 the lower end of the arm 51 (the right end as viewed in Fig. 2) rests against a collar 52 which is securely fastened to the clutch barrel 49 and rotates therewith. There is a notch (not shown) in the collar 52 which can freely ride past the arm 51 when the clutch barrel 49 is being rotated in its driven direction, i. e. when the clutch magnet 45 is energized and the clutch 44 is engaged. The purpose of this notch will presently appear. The clutch 44 is engaged when the clutch magnet 45 is energized. This will be clear when it is explained that there is a toothed wheel 53 on the end of the drive shaft 30. A flat finger 54 is located in the end of the clutch barrel 49 for sliding movement in a radial groove (not shown). The finger 54 is spring-biased radially inward so that it tends to engage the toothed wheel 53 and then carry the clutch barrel 49 around with the shaft 30 in a positively connected manner. In order to cause the clutch 44 to be disengaged, the lug 48 which is situated at right angles to finger 54 will push the finger 54 radially outward to disengage the toothed wheel 53, when the lug 48 is engaged by the right end of arm 46 (as viewed in Fig. 2). The purpose of the notch (not shown) in collar 52 will now be apparent. It is to keep the clutch barrel 49 from sliding back under the force of the spring (not shown) on finger 54 which reacts on the lug 48 and so against arm 46.

When clutch 44 is engaged, a shaft 60 is driven with the clutch barrel 49 because of a set screw 61 which fastens the clutch barrel 49 to the shaft 60. Shaft 60 drives the tape feed and reading mechanism now to be described. The tape feed mechanism, previously mentioned is the short-spoked drive wheel 32, the spokes 33 of which engage the feed holes 31 (Fig. 4) of the tape 21 (Figs. 1 and 4) and so advance the tape from one reading position to the next. This drive wheel 32 is fastened securely to a shaft 62 which is given a step-by-step rotation by means of a ratchet mechanism 63 which is driven from the shaft 60. The ratchet mechanism 63 consists of a cam follower plate 64 which is pivoted about a stud 65, located on framework 66 and its associated mechanism. Follower plate 64 carries at least one ratchet pawl as shown to engage a toothed wheel 67, which is carried by and drives the shaft 62 to turn the drive wheel 32 in steps. The follower plate 64 is rocked back and forth about the stud 65 by means of an appropriately shaped opening in the plate 64 which is engaged by a cam 68 of the necessary shape and which acts like an eccentric. The rocking back and forth gives step-by-step rotation to the toothed wheel 67 in a well known manner by the action of one or more pawls which are spring-biased into engagement with the toothed wheel 67 and functions as a ratchet.

While the tape 21 is in reading position between steps, the reading mechanism now to be described operates to cause a given electrical circuit to be selected which in turn may cause a desired function to be performed when this selected circuit is energized. There are separate circuits for energizing an electric typewriter which has a circuit for each character to be printed as well as one for each function to be performed, e. g. for spacing, carriage return, etc. A selection of any given one of these circuits is made by energizing a given combination of six multiple contact relays R1–R6, shown in Fig. 9*b*. Energization of the given combination of these relays R1–R6 is determined by holes 71 punched in the tape. As may be seen in Fig. 4, there are six locations where holes may be found for each reading position of the tape 21. There is a reading position corresponding to each feed hole 31. The manner in which the selected circuit is energized will be more fully explained later in connection with the circuit diagram, but the mechanism for determining what combination of the six relays R1–R6 will be energized each time the tape 21 is read, will now be described.

Figure 3:
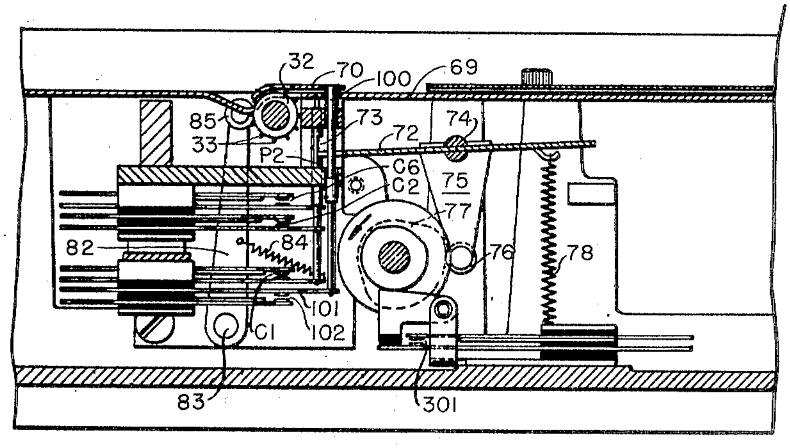
Fig. 3 is a fragmentary cross-sectional view of a tape reader unit taken along the line 3—3 of Fig. 2.
Figure 4:
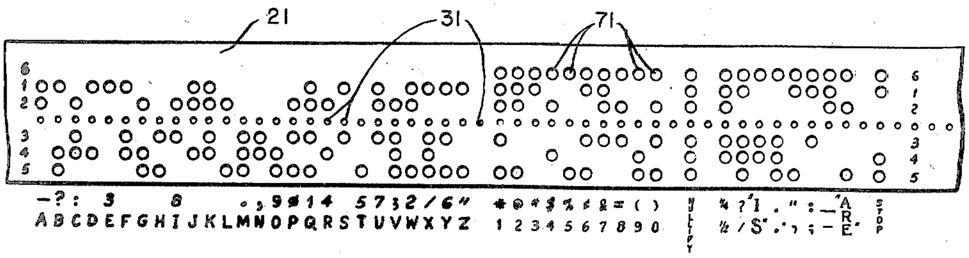
Fig. 4 shows a specimen of the tape used in a reader unit such as that disclosed here; the same type of tape will be punched by a tape punching unit of the kind disclosed here.

There are six pins P1–P6 (see Figs. 2 and 3) which correspond to the locations where the combinations of six code holes 71 will be located for each reading position of the tape. The tape 21 is not shown in Figs. 2 and 3, but slides along across a table 69 (Fig. 3) and under a guide 70. Each of the pins P1–P6 controls a corresponding set of contacts C1–C6 (Fig. 3 and circuit diagram Fig. 9*b*). These pins P1–P6 are held down and their corresponding contacts C1–C6 are held open during the movement of the tape 21 from one reading position to the next. This is accomplished by a bail 72 which makes contact with notches 73 in each of the pins P1–P6. The bail 72 is rocked about pivots formed by the bearings which carry a shaft 74, to which the bail 72 is securely fastened as shown. In order to rock the bail 72 at the proper time in synchronism with the stepping action of the tape 21, such rocking is accomplished by means of an arm 75 which is securely fastened to the bail 72 as shown. The arm 75 carries a follower wheel 76 at the end thereof, which cooperates with a cam 77, located on the shaft 60 which is driven whenever the clutch 44 is engaged. To keep the follower 76 in engagement with the cam 77, the bail is spring-biased for clockwise rotation (as viewed in Fig. 3) by a spring 78. The cam 77 is so shaped that the pins P1–P6 will be held down below the strip of tape 21 while the tape 21 is being stepped from one reading position to the next. Then when the tape 21 has stopped in a reading position so that the holes 71 are located over their corresponding pins P1–P6, the bail 72 is rocked up to allow all those pins which have holes located over them to rise to their top position and so close their corresponding contacts C1–C6. Those pins which do not have holes located over them are held down by the tape 31 and so do not close their corresponding contacts.

There is a stepping wheel positioner which insures that the drive wheel 32 is brought to rest in the exact position desired after each step of the wheel 32 and the tape. The positioner consists of an arm 82 which is pivoted at the bottom on a stud 83, and which is spring-biased to the right as viewed in Fig. 3 by a spring 84. There is a small wheel 85 at the end of the arm 82 which engages a notched wheel 86 (Fig. 2) which is securely fastened to the shaft 62, and therefore determines the exact position at which drive wheel 32 comes to rest after each step in a well known manner.

In order to understand the operative relation of the tape reader unit better, the circuit diagram will be referred to, particularly Figs. 9*a*, 9*b*, 9*d* and 9*e*. The motor 38 (Fig. 9*a*) will first be turned on by means of a switch 91. The switch 38 is located on one side of an alternating current line which may be introduced at terminals R7 and R8 on the reader unit. As may be seen, the closing of the switch 91 energizes the motor 38 by means of a circuit which may be traced as follows: beginning at terminal R7 and going over a wire 92, through now closed switch 91, over a wire 93 directly to the motor 38 and returning from the other side of the motor 38 over a wire 94 to the other terminal R8. It will be noted that by use of appropriate parallel circuits, the motors of the typewriter unit 19 and of the punch unit 20 will be energized at the same time as motor 38 of the reading unit 16. There are switches 95 (Fig. 9*d*) and 96 (Fig. 9*h*) located on the typewriter unit and the punch unit, respectively, which are similarly connected in parallel with the switch 91 so that by closing any one of the three switches (91, 95 or 96) all three motors (reader, typewriter and punch) will be energized, and when so conditioned the units will be ready for operation.

Before the reading unit 16 will be in an operative condition, there must be a tape, such as the sample strip 21, in place along the table 69. To insure this condition, a large sized pin 100 (Figs. 2, 3 and 9*a*) is located just ahead of the row of sensing pins P1–P6 as the tape 21 travels over the table 69, and if there is a tape in the machine the pin 100 will be held down against the spring action of a resilient contact carrying arm 101 which carries the upper contact of a switch 102. Therefore, if a tape is in the machine, the switch 102 will be closed and one side of the parallel circuits for the clutch magnet 45 and a control relay 103 will be energized. The clutch magnet 45 and the control relay 103 are operated from a direct current source consisting of a conventional rectifier 104, which is energized from a transformer 105, the primary winding of which is connected across the alternating current line wires 93 and 94 as shown. One side of the direct current source is connected directly to the upper contact of the tape sensing switch 102 by means of wires 106 (from bottom of rectifier 104), 107, 108 and 109, so that the negative side of the direct current source is established for the clutch magnet and the control relay when there is a tape in the machine.

Figure 5:
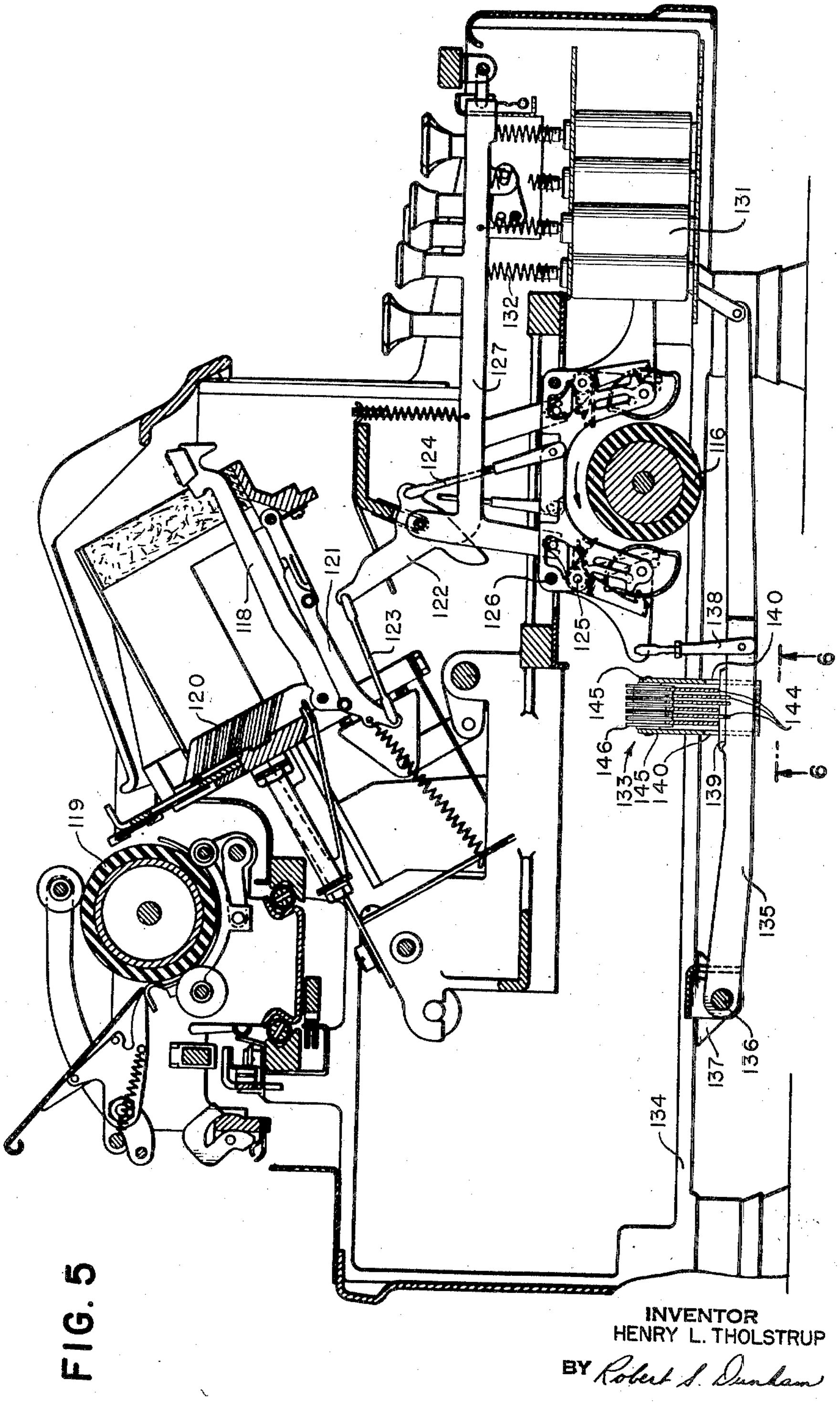
Fig. 5 is a cross-sectional and elevational view of an electric typewriter taken along the line 5—5 of Fig. 1.
Figure 6:
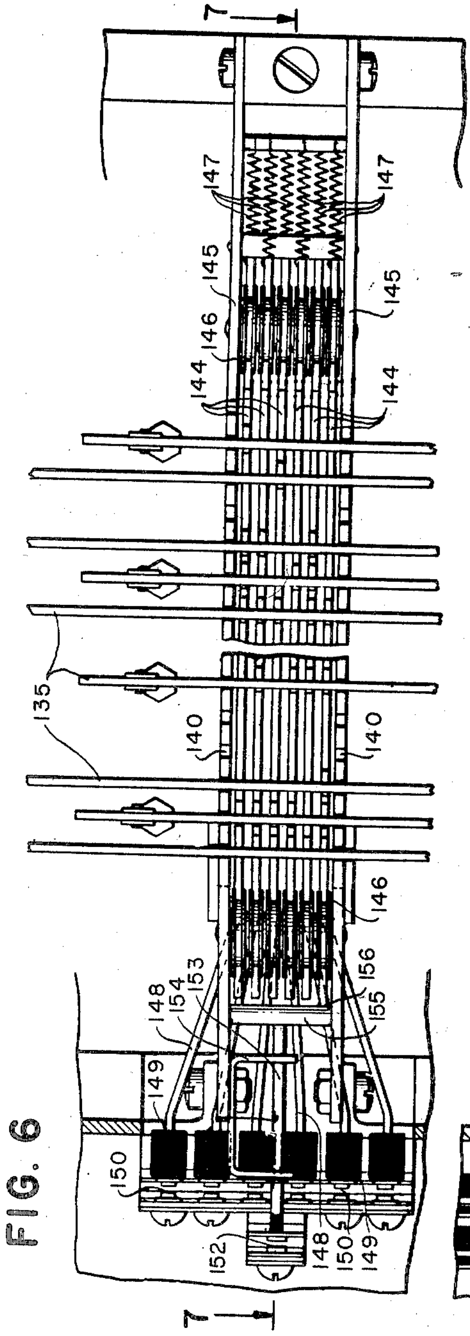
Fig. 6 is a fragmentary bottom view looking up, of a permutation unit on the electric typewriter, including that portion indicated by the line 6—6 in Fig. 5.
Figure 7:
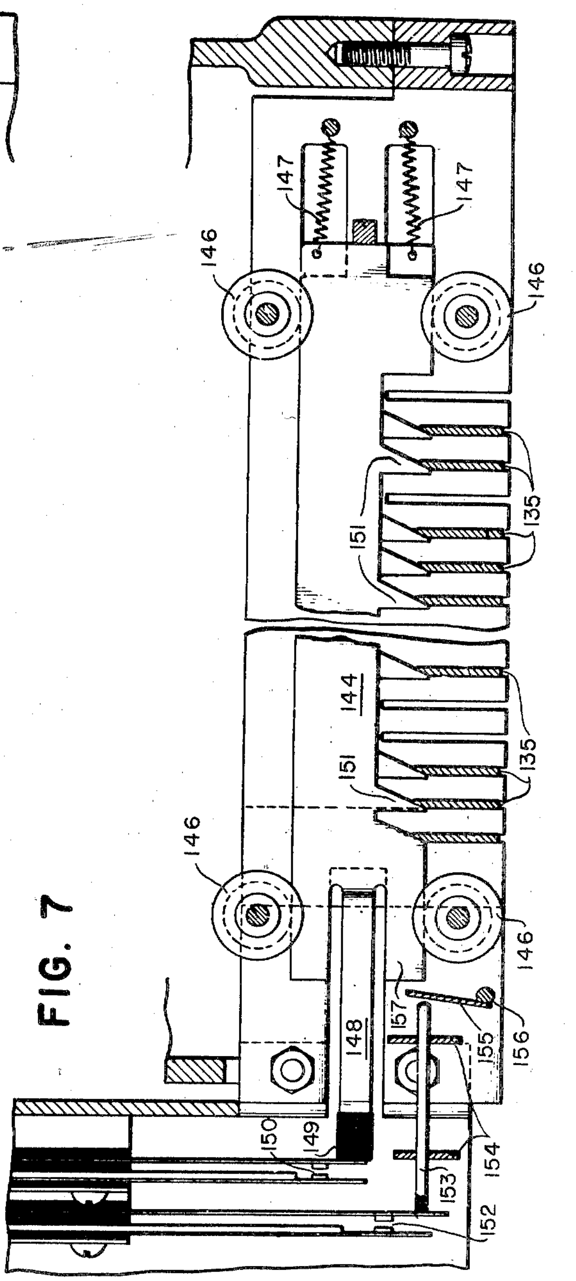
Fig. 7 is an end elevation cross-sectional view of the permutation unit taken along the line 7—7 of Fig. 6.

Before continuing with a description of the circuit diagram, the mechanical features of the typewriter unit 19 and of the punch unit 20 will be covered. Referring to Figs. 5, 6 and 7, the mechanical features of the typewriter unit will be generally described, it being understood that details of this machine are not material to the instant invention, and reference may be had to my aforementioned patent, No. 2,439,497, for such details, there being, however, an addition to the typewriter unit shown in said patent (No. 2,439,497), which consists of a permutation unit such as that shown on the typewriter unit of my U. S. Patent No. 2,436,126, issued February 17, 1948.

The typewriter unit 19 is illustrated by a view (Fig. 5) down the center along the line 5—5 in Fig. 1. This view shows the typewriter as including a power driven roller 116 which is continuously rotated by a motor 117 (not shown in Fig. 5) and serves to supply the power to operate the type bars 118. The type bars 118 carry the various characters to be printed on the ends thereof in an ordinary typewriter manner, and the typing is accomplished in cooperation with a platen 119 which will have a sheet of paper wrapped around it to receive the impression of the type face to imprint characters as they are typed. Type bars 118 are pivoted in a usual type bar segment 120 and are each actuated by a toggle 121 which is connected to a sub-lever 122 by means of a pin 123. Sub-lever 122 in turn is actuated by a pin 124 which connects to a cam unit 125 by means of a lever pivoted about a rod 126. Each cam unit is actuated by means of its corresponding key lever such as key lever 127. The key lever causes the cam unit to be moved into contact with the surface of driven roller 116, which surface is of some resilient material with sufficient friction quality to cause the cam unit to be actuated in a well known way. Details of such a cam unit may be found in U. S. Patent No. 1,777,055, issued September 30, 1930 to Russell G. Thompson.

It will be noted that there are solenoids 131 located beneath the key levers and attached to the respective levers by springs. The solenoids 131 are used in conjunction with the reading unit 16 to actuate the proper key lever as its code combination is read from the tape in the reader. This will be clearly understood when the circuit diagram is completely described later. The key levers may, of course, be actuated by means of the keys manually. This would be done if it were desired to use the typewriter unit alone as an electric typewriter, or if it were desired to use the punch unit in conjunction with the typewriter unit so as to perforate a tape to correspond to the typed text, for later automatic reproduction. In order to accomplish the latter, there is included on the typewriter unit 19 a permutation unit 133. This unit is shown in two enlarged views in Figs. 6 and 7, as well as in its cooperative relation with the typewriter in Fig. 5. The purpose of the permutation unit 133 is to energize a specific combination of six separate electric circuits for each character printed or function performed by the typewriter.

Located underneath the frame 134 of the typewriter unit are a number of flat arms 135, all pivoted about a rod 136 (Fig. 5 only), which is fastened at its ends to the typewriter frame 134 by means of brackets 137, one of which may be seen in Fig. 5. Each of the flat arms is connected to a corresponding cam unit 125 by a pin 138 so that it (arm 135) will be rocked up by pivoting about rod 136 whenever its corresponding cam unit 125 is actuated by the key lever 127 with which it is associated, so that depression of any key 127, either by means of its corresponding solenoid 131 or manually, will cause simultaneous actuation of a type bar 118 and a flat arm 135 of the permutation unit. Each arm 135 has a raised edge 139 which is tapered on one side like a chisel. Each arm 135 also rides in a pair of guide slots 140, to give a desired camming action as will presently appear. There are six slides 144 which are located across the bottom of the typewriter, in the permutation unit 133. The unit 133 has side walls 145 between which the slides 144 are located. It is these side walls which carry the guide slots 140. The slides 144 are mounted on rollers 146 for lateral movement at right angles to the upward motion of the flat arms 135. Each of the slides is spring-biased to the right as viewed in Figs. 6 and 7 by means of springs 147. At the left end each slide terminates in an arm 148 which carries a tip 149 made of insulating material and operatively in engagement with a pair of switch contacts 150.

As each flat arm 135 of the permutation unit is rocked upward about its pivot, the raised edge portion 139 which extends the full width of the permutation unit 133 will contact one or more tooth-shaped cam surfaces 151 (see Fig. 7) and cause the corresponding slide or slides 144 to be moved over to the left and close the contacts of its switch or switches 150. Therefore, it will be appreciated that by having cam surfaces 151 on each of a desired combination of slides 144, located over a particular pair of slots 140 and the arm 135 riding therein, that particular combination of contacts 150 will be closed and, as will be seen presently, a corresponding combination of punch magnets will be actuated to cause a set of code holes to be punched into a tape 22 (Fig. 1) located in the punch unit 20.

There is an additional set of contacts 152 located at the same end of the permutation unit 133 as the six sets of contacts 150. This additional set of contacts 152 is actuated by a pin 153 which slides in holes in a guide bracket 154. The pin 153 is actuated by a bail member 155 which pivots about a rod 156 to which the bail is fastened. The bail 155 is actuated by any one of the six slides 144. Each slide has a square shoulder 157 at the lower left end thereof (as viewed in Fig. 7), and whenever any of the slides 144 are actuated to slide over and close their respective switches, the bail member 155 will be contacted by the shoulder or shoulders 157 and so will actuate pin 153 and close contacts 152. The parts are so arranged that this single pair of contacts 152 will not close until after all of the pairs of contacts 150 that have been actuated are closed. The purpose of this arrangement is to insure a simultaneous energization of the selected circuits as determined by the sets of contacts 150 that are closed.

Figure 8:
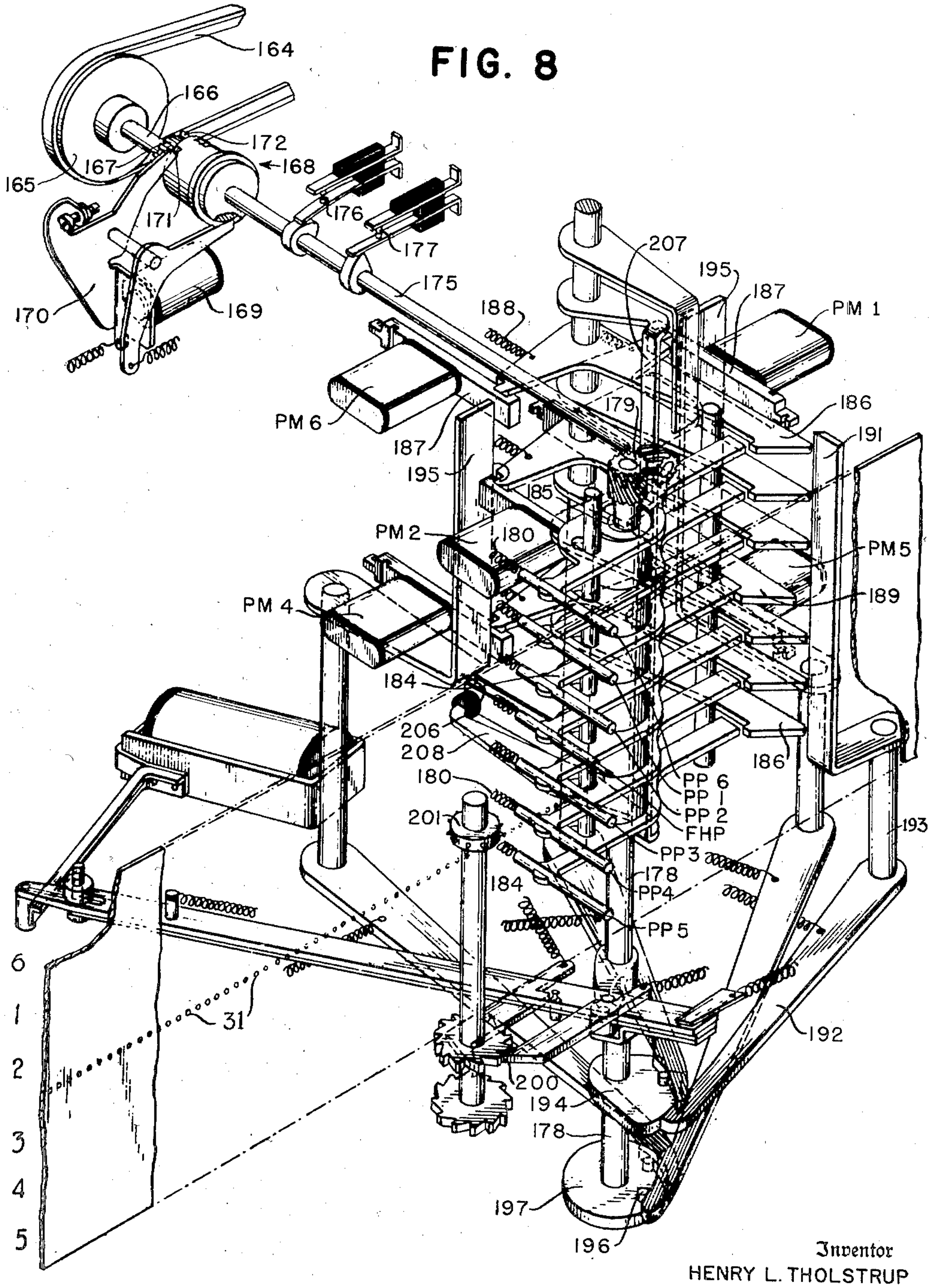
Fig. 8 is a perspective view of the main operating parts of a tape punch unit.

In Fig. 8 the mechanism of the punch unit 20 is schematically illustrated. A motor 163 (Figs. 1 and 9*h*) drives a belt 164 carried by a pulley 165 which is securely fastened to a shaft 166 which in turn carries a toothed wheel 167, also securely fastened to the shaft 166. Whenever the power circuit of any unit is closed (reader, typewriter or punch), motor 163 will be energized and the toothed wheel 167 will be continuously rotated. A clutch unit 168 which is exactly the same in principle as the clutch 44 used on the reading unit 16 is employed for control of the punch unit. The details of clutch unit 168 need, therefore, not be described. Suffice it to say that it is a single revolution clutch which is actuated by the energization of the clutch magnet 169 which trips a lever arm 170 and thereby allows a lug 171 to pass beneath the lever arm 170 and also allows a flat finger 172 to engage the toothed wheel 167 as explained with reference to the clutch 44 on the reading unit. After one revolution, if the clutch magnet is not again energized, the lug 171 will strike the lever arm 170 and disengage the clutch again leaving it in the home position as shown in Fig. 8.

Whenever the clutch magnet 169 is energized, a revolution of a shaft 175 will take place. Such revolution will cause a pair of switch contacts 176 to be closed soon after the revolution begins, and also will cause a pair of switch contacts 177 to be opened soon after the revolution has begun. The purpose and function of these switches (176 and 177) will be made clear in connection with the circuit diagram to be described later. A revolution of the shaft 175 will cause a revolution of a driven shaft 178 by means of suitable gears 179. When the shaft 178 revolves, it actuates a feed hole pin FHP which will consequently punch the tape feed holes 31, one feed hole being punched at each revolution of the shaft 178.

Punching of the feed holes 31 and selected code holes (such as 71, Fig. 4) is accomplished in the following manner. Each of the punch pins PP1–PP6, as well as the feed hole punch pin FHP, is spring-biased back away from the tape by means of a spring 180. Each punch pin PP1–PP6 and the feed hole punch pin FHP has a cooperating arm 184 which cooperates with an eccentric 185 located on the shaft 178. Therefore, whichever of arms 184 do not have their far ends held by one of a corresponding series of latching members 186, such arms will pivot about their corresponding punch pins PP1–PP6, and no movement of those punch pins will take place. Consequently no code holes corresponding to the locations of such punch pins will be punched out. However, whenever any of the punch magnets PM1–PM6 are energized, the corresponding latching members 186 will be released by the movement of armature pieces 187, and then springs 188 will cause the corresponding latching members 186 to fall into latching engagement with corresponding cooperating arms 184. A central latching member 189 is shown in latching engagement with its cooperating arm 184. This central cooperating arm is the one which cooperates with the feed hole punch pin FHP, and so it always remains with its latching member 189 in latching engagement so that a feed hole is punched in the tape for every revolution of the shaft 178. It will be clear, therefore, that if any of the punch magnets PM1–PM6 are energized, corresponding cooperating arms 184 will be held against movement at the end remote from the punch pins PP1–PP6 when the eccentric action takes place, and latched arms 184 must pivot about the latched ends which causes the corresponding punch pins to be moved out against their restraining springs and so punch corresponding holes in the tape.

To insure proper action of these parts, there is a bail 191 which is actuated by an arm 192, which in turn swings with a pivot shaft 193 in movements controlled by a cam 194 which is carried by the shaft 178. The bail 191 moves in behind any latching members 186 which have been tripped and insures their remaining in engagement with the ends of corresponding cooperating arms 184. At the same time the bail 191 is held in engagement with the sloping edge of all untripped latching members 186 and prevents accidental tripping of the same. There are two knock-off bails 195 which are actuated by a pin 196 on a disc 197 that act to return any armatures 187 which have been actuated by the energization of corresponding punch magnets PM1–PM6. This action sets up the mechanism ready for the following code group of punch magnets to be energized at the beginning of the next cycle of operation of the punch mechanism. It is to be noted that one revolution of the shaft 178 completes one cycle of the punch mechanism. Each cycle includes the action of stepping the tape one space following the punching thereof. This is accomplished by a conventional ratchet device 200 which drives a stepping wheel 201 which in turn has short spokes to engage feed holes 31 and so will advance the tape as desired.

There is a set of contacts 206 which are physically closed whenever any of the punch magnets PM1–PM6 are energized. This is accomplished by a bail 207 which extends across the edges of all the latching members 186 to be actuated by any of them that are tripped. The bail 207 carries an arm 208 at the lower end thereof, which engages one side of spring leaf contacts 206 and so closes these contacts upon the tripping of any one or more of the punch magnets PM1–PM6. Control latching member 189 is notched out so as not to affect bail 207.

*Electrical operation*

The electric circuits for the combined operation of the four units of this invention are shown in Figs. 9*a*–9*h*. An introductory description of part of the complete circuit has been given above, wherein it was pointed out that the motors of all three mechanical units (reader, typewriter and punch) are simultaneously energized by closing the switch at any one of them. In order to set up various operating conditions such as were indicated above, e. g. typewriter alone, reader-typewriter, typewriter-punch or reader-typewriter-punch, there is provided herein a control panel 215 (see Fig. 9*e*) which may be conveniently located on the typewriter unit 19 (Fig. 1). Three switches are located on the control panel 215, one being a reader switch 216, one being a punch switch 217, and one being a run-step switch 218. The reader switch 216 is directly in the circuit of the control relay 103 (Fig. 9*a*) of the reading unit so that this relay cannot be energized unless switch 216 is closed. If the relay 103 is not operated, the reading unit will not operate, so reader switch 216 determines whether the reading unit is to be included in the operating combination or not. Similarly the punch switch 217 is in series with one side of the direct current source for the punch unit 20, so that the punch unit will be inoperative unless this switch 217 is closed.

The run-step switch 218 is ordinarily left in the run position, but if it is desired to read a single character at a time, from the reader, this may be accomplished. The run-step switch 218 is a multiple pole double-throw switch which is designed to remain in a middle or neutral position as shown (Fig. 9*e*), or to remain in the run position which would be gained by moving an actuating lever 219 to the left as shown in Fig. 9*e* causing right-hand contacts 220 and 221 to be closed and opened respectively which sets up proper operating circuits for continuous operation. If, however, a single step of operation is desired, the lever 219 will be moved to the right causing actuation of left-hand contacts 222 and 223. The switch 218 is so designed that it must be held over in the step position (actuating the left-hand set of contacts) or it will return itself to the neutral position. A single step operation will be optained then by moving switch 218 to the step position and then releasing it. The circuit arrangement is such that upon switching to step position a condenser 224 is connected into the direct current circuit of the clutch magnet 45 (Fig. 9*a*) of the reading unit, so as to allow the charging current of this condenser 224 to actuate the clutch to give one cycle of operation only. Then to obtain another single step, switch 218 would be thrown to step position again to repeat a single cycle of operation. It does not matter how long the switch 218 is held in step position, because only the charging current of condenser 224 will actuate the clutch magnet 45 and then it will have an open circuit in effect since this circuit is direct current.

In order to understand this invention it is not necessary to explain operation of the various functional steps which may be effected, e. g. such steps as carriage return, back space, shift, etc. For a complete explanation of such steps, reference may be had to my prior patents mentioned and also to my prior Patents Nos. 2,378,371, granted June 12, 1945 and 2,392,275, granted January 1, 1946. However, a step of reading one character from the tape in the reading unit 16 (Fig. 1) will be traced through the printing of such character by the typewriter unit 19 and the punching of the corresponding code holdes in the tape carried by punch unit 20. Then a basis for understanding an important feature of this invention will be laid. Beginning with Figs. 9*a* and 9*b* and assuming the letter "S" is being read by the reading unit 16, clutch magnet 45 will be energized by pressing a start switch 228, which effects energization of the control relay 103. This relay has two coils which oppose one another, the right-hand coil acting as a bucking or neutralizing coil such that whenever it is energized the relay will drop out and its contacts will return to the position shown. This bucking coil is under control of a circuit fed by a conventional rectifier 229, the direct current circuit from this rectifier being as follows: from the top junction of the rectifier 229 (as shown in Fig. 9*a*) through a wire 230, then through the right-hand coil of the relay 103 and back through a wire 231, contacts 232 (closed when relay is operated), a wire 233 to the bottom junction of the rectifier 229. Energization of the rectifier 229 is under control of several parallel circuits which will be pointed out presently. Energization of the control coil (left-hand) of the relay 103 is under control of several parallel circuits also, a primary one being that including the start switch 228. Other parallel circuits for energizing this control coil (left-hand) of relay 103 are concerned with functional operations being effected at the typewriter unit 19 and will be disregarded. The start switch 228 energizing circuit may be traced as follows: beginning at the direct current bus wire 106, which is connected to the lower junction of the rectifier 104, and following over wires 107, 108, 109 and tape senser switch 102, wire 234, to the left-hand or energizing coil of the control relay 103; then back to the other side of the direct current source from the other side of the energizing coil, over wire 235, closed contacts 236, wire 237 (carried over to Fig. 9*b*), terminal RT58, terminal TR58 (Fig. 9*d*), wire 238 (carried over to Fig. 9*e*), reader switch 216 (now closed), wire 239, wire 240, wires 241, 242, 243, wire 244 (carried back to Fig. 9*d*), terminal TR60, terminal RT60 (Fig. 9*b*), wire 245 (carried back to Fig. 9*a*), wire 246 to start switch contacts 247 (now closed), to direct current bus wire 248 which is connected to the upper junction of rectifier 104. When the relay 103 is energized it closes a holding circuit which may be quickly traced from the left-hand coil over wire 235, now closed contacts 249, wire 250, resistor 251, wire 252, wire 253, to the same direct current bus wire 248. Therefore, once control relay 103 is energized, it will remain so until its bucking coil (mentioned above) is energized. Energization of this bucking coil (right-hand coil of relay 103) is controlled by controlling the energization of rectifier 229 since the bucking coil is directly connected to the rectifier 229 whenever the relay 103 is energized, as was already shown above. There are quite a number of parallel circuits for energizing rectifier 229, but most of them are concerned with functional operations of the typewriter unit, and only the one circuit controlled by the stop switch 254 will be traced. Beginning at the alternating current bus wire 92 which is connected to the alternating current terminal R7, following over switch 91 (now closed), wire 255, wire 256 to the left-hand terminal of rectifier 229, then from the right-hand terminal of rectifier 229 over wire 257, resistor 258, wire 259, wire 260, stop switch contacts 261, wire 262 to alternating current bus wire 94 which is connected to the other alternating current terminal R8.

It will be noted that control relay 103 has primary control over the reader unit because it (relay 103) includes a set of contacts 271 which are located directly in the energization circuit of the reader clutch magnet 45. This energization circuit will not be traced in detail, it being sufficient to point out that the clutch magnet 45 is in a direct current circuit which may be considered as beginning at tape sensing switch 102, and going to one side of the clutch magnet coil 45, then from the other side of the clutch magnet coil, the circuit goes to lower contacts 272 of the start switch 228. Then the circuit goes to lower contacts 273 of the stop switch, then to contacts 271 of control relay 103, then via Fig. 9*b* and Fig. 9*d* to contacts 274 of insert relay 275 (Fig. 9*c*), then to contacts 276 of insert relay 277 and back via Fig. 9*d* to terminal RT56 (Fig. 9*b*). From terminal TR56 (Fig. 9*d*) the circuit continues to various contacts controlled by different functional operations of the typewriter unit and finally back to the other side of the direct current source derived from rectifier 104. The remainder of the circuit as completely traced will be found in Figs. 9*e*, 9*f* and 9*g* also.

Fig. 9*f* shows the connections at a plug-board 291 (indicated by the dotted lines). This board is used for the purpose of eliminating various functions as may be desired, but is normally connected up as shown. Jumper connectors 292 may conveniently be a short "bottle" type of "plug-in" connector.

Returning to Figs. 9*a* and 9*b* and referring to a reading operation, when the code for the letter "S" is sensed, pins P1 and P3 will be allowed to rise through the corresponding holes 71 (Fig. 4) in the tape 21 being read. This allows corresponding contacts C1 and C3 (see Fig. 3 and Fig. 9*b*) to be closed which conditions direct current circuits (readily traceable) for selector relays R1 and R3. Then shortly after the sensing pins are allowed to rise against the tape in a cycle of reader operation, cam operated switch 296 (Fig. 9*a*) will be closed and consequently will energize relays R1 and R3 simultaneously (Fig. 9*b*).

Relays R1–R6 are multiple contact relays, the contacts of which are spring-biased to the upper position (as shown in Fig. 9*b*) when the relays are deenergized. The multiple contacts are conveniently made in units containing four single-pole, double-throw switches, and hence the contacts operated by relays R1 and R2 are connected in multiple in order to make use of otherwise idle contacts. It will be observed that by using a ladder-type of connection from one set of contacts to the next, it is possible to select any one of 64 different circuits depending upon what combination of relays is energized.

Therefore, when relays R1 and R3 are energized, a circuit will be selected which is connected to the solenoid 131 on the typewriter unit which corresponds to the letter "S." Solenoids 131 are alternating current operated, and the circuit to energize the "S" solenoid may be traced as follows: beginning at alternating current terminal R1 (Fig. 9*a*) and going over a short length of alternating current bus wire 94, then over wire 297, to terminal RT61 (Fig. 9*b*), and then from TR61 (Fig. 9*d*), over wire 298, wire 299, to terminal TR65, then from corresponding terminal RT65 (Fig. 9*b*) over wire 300, to cam operated switch 301 (Fig. 9*a*), then over wire 302, to the contacts of relay R1 (Fig. 9*b*). Because relay R1 is energized, the circuit will continue from the lower contacts of relay R1, over wire 303, to upper contacts of relay R2, and then over wire 304 to contacts 305 of relay R3. Since relay R3 is also energized, the circuit will now continue over the lower contact of contacts 305 to wire 306, upper contacts 307 of relay R4, wire 308, upper contacts 309 of relay R5, wire 310, upper contacts 311 of relay R6 to wire 312 which connects to terminal RT46. The circuit continues from typewriter terminal TR46 (Fig. 9*d*) over wire 313, wire 314, to the "S" solenoid 131 and then back over wire 315, common return wire 316, wire 317, terminal TR66, corresponding terminal RT66 (Fig. 9*b*), wire 318, wire 319 (continues over to Fig. 9*a*), wire 255, to switch 91 which will be closed, then wire 92 to alternating current terminal R7, completing the circuit and energizing the "S" solenoid 131.

It will be evident that as a tape is being read, some one character will be sensed each cycle of operation, and such character will be typed because of the energization of its corresponding solenoid circuit. When the punch unit 20 is switched into operation by means of punch switch 217 (Fig. 9*e*) on the control panel 215, actuation of the typewriter key lever 127, which corresponds to the solenoid 131 which was energized, will cause the permutation unit 133 to be actuated and so close the proper combination of contacts 150 in the manner previously pointed out. Such combination in case the letter "S" is typed comprises the contacts controlling punch magnets PM1 and PM3. The energization of these two circuits will be clear if one of them is traced. Taking the circuit of punch magnet PM1 and beginning at the direct current plus (Fig. 9*h*) bus wire 323 and going to punch terminal PT8, then from corresponding typewriter terminal TP8 (Fig. 9*g*) over wire 324, wire 325 to switch 217 (Fig. 9*e*) which is now closed, then over wire 326 (back to Fig. 9*g*), wire 327, wire 328 to contacts 152 which will be closed by the action of the permutation unit 133 as previously described. The circuit then continues over wire 329 (common to one side of all contacts 150) and over the top set of contacts 150 (as shown in Fig. 9*g*), wire 330, wire 331, wire 332, wire 333, to terminal TP1, then from corresponding punch terminal PT1 (Fig. 9*h*) over wire 334 to one side of punch magnet PM1. The completion of the circuit is then made by following from the other side of punch magnet PM1 over common wire 335, and wire 336 to the minus side of the direct current source as shown. Of course, the corresponding circuit for punch magnet PM3 will be energized at the same time, and the proper code holes will be punched in the tape being generated.

*Relay storage unit*

An important feature of the present invention is the relay unit which will be described entirely in connection with the circuit diagram since the physical location of the relays is unimportant as previously pointed out.

Generally what the relay unit can accomplish is to energize any predetermined sequence of typewriter circuits while operation of the reading unit 16 is suspended. In this way any insert may be made in the text taken from a control tape or in the copy being manually typed by merely energizing an initiating circuit once. For example, the relay unit illustrated in Fig. 9*c* is set up to cause either "is" or "are" to be typed upon energization of one of these two initiating circuits. The present description will be confined to the group of relays for causing "is" to be typed, it being understood that any desired word, words or groups of characters may be typed if a group of relays is properly wired into the system in accordance with the teaching of the two groups ("is" and "are") here illustrated.

Operation of the relay unit will be clear when operation of the "is" group of relays is explained. Each of the relays in the "is" group is designated by Roman numeral I, while each of the relays in the "are" group is designated by Roman numeral II. In order to initiate operation of the "is" group, there is utilized the insert relay 277 (Fig. 9*c*), the energization of which may be controlled by either a manual switch 341 or by a relay controlled switch 342. The manual switch 341 may be located in any convenient place such as near the typewriter keyboard. The relay switch 342 is controlled by one of the circuits which the reader unit selects, so that when (in this instance) the code hole combination 3, 4, 6 is read on the tape, a relay 343 will be energized. This energization circuit is similar to that traced for the letter "S" and will not be traced in detail. It will be sufficient to note that relay 343 is alternating current operated, as are the solenoids 131 of the typewriter unit 19.

Insert relay 277 will thus be energized by the completion of a direct current circuit beginning at the direct current bus wire 248 (Fig. 9*a*) and going over wire 253, wire 344 (Figs. 9*a* and 9*b*) to terminal RT57, then from corresponding terminal TR57 (Fig. 9*d*) over wire 345, wire 346 (Figs. 9*d* and 9*c*), wire 347, switch 342 (or parallel switch 341), wire 348, wire 349 to lower contacts of switch 350 (now closed) and over wire 351 to one side of the winding of relay 277. The rest of the circuit is completed by following from the other side of relay winding 277, over wire 352, now closed switch 353 which is operated by relay 354, wire 355, wire 356 (Figs. 9*c* and 9*d*), wire 357 to terminal TR33, then from corresponding terminal RT33 (Fig. 9*b*) over wire 358 (Figs. 9*b* and 9*a*), wire 107, to the other direct current bus wire 106. Such energization causes relay 277 (Fig. 9*c*) to pick up its contacts which then initiate a sequence of actions and at the same time open the clutch magnet circuit of the reading unit 16 so that the operation of the reading unit will be suspended. As previously described, switch contacts 276 are in this clutch magnet circuit and will be opened upon energization of relay 277.

Energization of relay 277 also causes the upper contacts of switch 350 to be closed, completing a holding circuit for the relay 277, which is obvious and will not be traced. It is noted, however, that this holding circuit when completed includes switch contacts 353 for breaking the holding circuit upon completion of the sequence being initiated.

A necessary element of the sequence operation is the direct current pulse producing cam 29 (Fig. 9*a*). The cam 29 is located on the driven shaft 30 (Fig. 2) of the reading unit 16 and is being continuously rotated whenever the three units (16, 19 and 20) are turned on as by any of their respective switches 91 (Fig. 9*a*), 95 (Fig. 9*d*) or 96 (Fig. 9*h*). Cam operated switch contacts 28 (Fig. 9*a*) are then being periodically closed and are thus producing cyclic pulses of direct current on a circuit which may be traced as follows: Beginning at direct current bus wire 248, which may be assumed to be positive, and going over wire 359, switch contacts 28, wire 360 (Figs. 9*a* and 9*b*) to terminal RT30, then from corresponding terminal TR30 over wire 361 (Figs. 9*d* and 9*c*) and wire 362 to switch contacts 363. Contacts 363 are closed by operation of relay 277 which then applies the direct current positive pulses to wire 364 from where they go to the center contact of switch 365.

It will be observed that the same source of direct current positive is supplied continuously to the upper contact of a remaining switch 366 on relay 277 (Fig. 9*c*). The circuit for this is the same as that already traced which was to energize relay 277, from the positive direct current bus wire 248 (Fig. 9*a*) to wire 347 (Fig. 9*c*). At this point the direct current positive is carried over wire 367 and the now closed contacts of switch 366, to wire 368, which leads to the normally closed switch 369. Switch 369 operates with switch 353 by the same relay 354. Therefore, direct current positive is normally supplied to a wire 370 (connected to switch 369) which leads to one side of each of the windings of relays 371 and 372.

When the first direct current pulse arrives after relay 277 has been energized, it will be carried over the circuit traced to switch 365 on relay 372 and then on to energize a relay 373 over lower contacts of switch 365, wire 374 and wire 375 to one side of the winding of relay 373. The other side of this relay winding is connected to direct current minus over a common direct current minus circuit which may be traced as follows: wire 375*a*, wire 376, wire 377, common wire 378 to wire 356 and return to direct current bus wire 106 (Fig. 9*a*) via the circuit already traced in connection with energizing relay 277. Therefore, relay 373 will be energized by this direct current pulse, and it will close its contacts 379 and 380. Contacts 379 close an alternating current energizing circuit for the first character of the selected sequence, which in this illustrated case is the letter "I" solenoid. This circuit will not be completely traced, it being sufficient to note that wire 381 leads to the letter "I" circuit, and on the other side of contacts 379 a circuit leads to the alternating current source over wire 382, now closed switch 383, wire 384, wire 385, wire 386 (Figs. 9*c*, 9*d*, 9*b*), wire 297 (Figs. 9*b* and 9*a*) wire 94 to terminal R8 of the alternating current supply.

The letter "I" solenoid will then be energized causing the typewriter to print this letter and also causing the punch to make a set of holes in the tape being punched providing the punch is switched into operation at this time. The cessation of the direct current pulse which initiated this action will cause the letter "I" circuit to be opened once more by means of the switch 383 which is controlled by relay 372. Relay 372 will be energized upon the cessation of the direct current pulse because, first of all, both relays 372 and 373 are so designed that they will operate on the reduced voltage present when they are connected in series across the direct current supply; secondly, the following circuit action occurs, the previous closing of switch 380 of relay 373 connected the two relays 372 and 373 in series across the direct current source as is evident by tracing from the steady direct current plus carrying wire 370 previously described, to winding of relay 372 and over wire 387 to switch 380, then over wire 388, wire 375 to winding of relay 373 and then to the negative side of the direct current line as previously traced. This series circuit has no effect (relay 372 is not energized) as long as the direct current pulse continues, because during this time the positive direct current is applied to both sides of the winding of relay 372 since the direct current pulse circuit is connected from wire 374 and via wire 388, switch 380 and wire 387 to the same side of the winding of relay 372 as is connected to one side of the winding of relay 373 in the series connection described. Now, when the direct current pulse ceases, the series circuit becomes effective to energize relay 372 and to hold relay 373 energized.

Energization of relay 372 opens switch 383 and hence releases the "I" solenoid. Also, the switch 365 is actuated to its upper position so that the direct current pulse carrying circuit is transferred to the next pair of relays 371 and 389. These two relays act in the same way as relays 372 and 373 did, e. g. the next pulse will be carried by wire 390 and the lower contacts of switch 391 over to the winding of relay 389. Then in the same manner as with corresponding relay 373, relay 389 will be energized which will energize the solenoid of the letter "S" by closing switch 392, and also will set up a similar series circuit for relays 371 and 389 by closing switch 393, acting to cause relay 371 to be energized upon cessation of the pulse under consideration and to energize relay 371 in the same way as relay 372 was for the letter "I." Thus, still in similar fashion switch 394 will be opened, releasing the "S" solenoid, and switch 391 will be actuated to close its upper contacts, shifting the pulse circuit down to wire 395 and so ready to energize the clear-out relay 354. Then when the next pulse occurs, relay 354 will open its two switches 353 and 369 and hence will clear out all holding circuits and will ready the system for continuing operation or for another selected insert to be commenced.

It will be evident upon inspection that the group of relays designated by Roman numeral II are those for making an insert "are." Clearly, any desired specific combination of characters may be provided for in the same way and the combination may be automatically inserted into the system whenever desired as has been explained in regard to "is" and "are" in the circuit shown.

Fig. 11 is a diagram of the operation of the relay unit previously described. All actions on the same horizontal lines take place substantially at the same time, while successive steps are shown spaced vertically, beginning at the top. This diagram may be used in determining the sequence of events in the operation of the unit.

While a specific embodiment of this invention has been shown and described in accordance with the statutes, it is to be understood that I do not desire to be limited thereto, but rather my invention includes any device which may fall within the scope of the appended claims.

I claim:

1. In combination with a tape reading device, an electric typewriter and a tape punching device, wherein are located separate electric circuits representing the characters to be recorded by said typewriter and by said punch, means for inserting any given message or predetermined specific combination of characters to be recorded by said typewriter and said punch which was not found on said tape, comprising, means for producing electrical pulses of a proper duration and spacing for sequentially energizing said character representing circuits, means for selecting a predetermined mesage, a relay storage unit for each message including a pair of circuit energizing relays for each circuit to be energized in said character representing combination, circuit means for actuating said pair of circuit energizing relays under control of said electrical pulses, a clear-out relay for resetting said pairs of relays after the last character representing circuit of said message is energized in order to condition said storage unit for a repeat, and circuit means for connecting said pulse producing means, said selecting means, and said storage unit to said character representing circuits for energization of the same in said predetermined combination.

2. In combination with a tape reading device, an electric typewriter and a tape punching device, wherein are located separate electric circuits representing the characters to be recorded by said typewriter and by said punch, means for inserting any given message or predetermined specific combination of characters to be recorded by said typewriter and said punch which was not found on said tape, comprising, means for producing electrical pulses of a proper duration and spacing for sequentially energizing said character representing circuits, means for selecting a predetermined message, a relay storage unit for each message including a pair of circuit energizing relays for each circuit to be energized in said character representing combination, one of said pair acting to energize the circuit and the other of said pair acting to transfer energization to the next pair of relays, circuit means interconnecting said pair of relays for introducing said electrical pulses to control the actuation thereof, a clear-out relay for resetting said storage unit after the last character representing circuit of said message is energized in order to condition said storage unit for a repeat, and circuit means for connecting said pulse producing means, said selecting means, and said storage unit to said character representing circuits for energization of the same in said predetermined combination.

3. In a relay system for energizing a plurality of circuits in a predetermined sequence automatically, the combination comprising a plurality of relays each having a plurality of contacts actuated thereby, a selector relay having a plurality of contacts, means for producing electrical pulses of a predetermined duration and spacing, means for actuating said selector relay, holding means connected to contacts of said selector relay for maintaining said selector relay actuated, circuit means connected to other contacts of said selector relay for actuating a first of said plurality of relays upon occurrence of one of said pulses, circuit means connected to contacts of said first relay for energizing a first of said plurality of circuits, holding circuit means connected to contacts of said first relay for maintaining said first relay actuated and for causing actuation of a second of said plurality of relays, upon cessation of said pulse, and a clear-out relay having normally closed contacts for deactuating all said relays upon receiving the next pulse after the last of said plurality of circuits has been energized.

4. In a relay system for energizing a plurality of circuits in a predetermined sequence automatically, the combination comprising a plurality of relays each having a plurality of contacts actuated thereby, a selector relay having a plurality of contacts, means for producing electrical pulses of a predetermined duration and spacing, means for actuating said selector relay, holding means connected to contacts of said selector relay for maintaining said selector relay actuated, circuit means connected to other contacts of said selector relay for actuating a first of said plurality of relays upon occurrence of one of said pulses, circuit means connected to contacts of said first relay for energizing a first of said plurality of circuits, holding circuit means connected to contacts of said first relay for maintaining said first relay actuated and for causing actuation of a second of said plurality of relays, further circuit means connected to contacts of said second relay for actuating a third of said plurality of relays upon occurrence of the next succeeding pulse, circuit means connected to contacts of said third relay for energizing a second of said plurality of circuits, holding circuit means connected to contacts of said third relay for maintaining said third relay actuated and for causing actuation of a fourth of said plurality of relays upon cessation of said next pulse, and a clear-out relay having normally closed contacts for deactuating all said relays upon receiving the next pulse after the last of said plurality of circuits has been energized.

References Cited in the file of this patent

UNITED STATES PATENTS

| | | |
|---|---|---|
| 2,095,730 | Bellamy | Oct. 12, 1937 |
| 2,122,112 | Powell | June 28, 1938 |
| 2,183,147 | Moore et al. | Dec. 12, 1939 |
| 2,199,541 | Harrison et al. | May 7, 1940 |
| 2,275,615 | Doty | Mar. 10, 1942 |
| 2,315,727 | Nichols | Apr. 6, 1943 |
| 2,436,126 | Tholstrup | Feb. 17, 1948 |